(12) United States Patent
Bihannic

(10) Patent No.: US 8,857,196 B2
(45) Date of Patent: Oct. 14, 2014

(54) OPTRONIC INFRARED SYSTEM WITH PREDICTIVE MAINTENANCE IN TERMS OF THE NUMBER OF CYCLES BEFORE BREAKDOWN

(75) Inventor: Didier Bihannic, Egly (FR)

(73) Assignee: Thales, Neuilly sur Seine (FR)

( * ) Notice: Subject to any disclaimer, the term of this patent is extended or adjusted under 35 U.S.C. 154(b) by 1025 days.

(21) Appl. No.: 12/989,372

(22) PCT Filed: Apr. 14, 2009

(86) PCT No.: PCT/EP2009/054370
§ 371 (c)(1),
(2), (4) Date: Oct. 22, 2010

(87) PCT Pub. No.: WO2009/130136
PCT Pub. Date: Oct. 29, 2009

(65) Prior Publication Data
US 2011/0037856 A1 Feb. 17, 2011

(30) Foreign Application Priority Data
Apr. 25, 2008 (FR) ...................................... 08 02336

(51) Int. Cl.
*G01J 5/10* (2006.01)
*F25B 49/00* (2006.01)
*F25D 29/00* (2006.01)
*G01J 5/06* (2006.01)

(52) U.S. Cl.
CPC ........... *F25B 49/005* (2013.01); *F25D 2700/12* (2013.01); *G01J 5/061* (2013.01); *F25D 29/00* (2013.01)

USPC .......................................................... 62/51.1

(58) Field of Classification Search
USPC .......................................................... 62/51.1
See application file for complete search history.

(56) References Cited

U.S. PATENT DOCUMENTS

| 5,729,474 A * | 3/1998 | Hildebrand et al. ........... 700/276 |
| 5,734,593 A * | 3/1998 | Madni et al. .................. 700/300 |
| 6,016,659 A | 1/2000 | Westhoven, Jr. et al. |

FOREIGN PATENT DOCUMENTS

JP  6-307924 A  11/1994

\* cited by examiner

*Primary Examiner* — Sath V Perungavoor
*Assistant Examiner* — Jeffery Williams
(74) *Attorney, Agent, or Firm* — Baker Hostetler LLP

(57) ABSTRACT

The invention relates to an optronics system equipped with: a detector cooler having a cooling machine, a cryostat, an IR detector placed in the cryostat, and a sensor for measuring the temperature $T_D$ of the detector; and a processing card which includes means for servocontrolling the cooling machine according to the temperature $T_D$. The system includes a sensor for sensing the system's internal temperature $T_S$, and the processing card includes means for calculating: the refrigerating time (TMF) based on the temperatures $T_D$ and $T_S$, on each "on-off" cycle of the detector cooler, the trend of the drift in the refrigerating time TMF, as a function of the number of "on-off" cycles of the detector cooler, a number of "on-off" cycles of the detector cooler before breakdown as a function of said trend of the drift of the TMF, and means for storing data used in said calculations; these data are aggregated data and not the measurements of temperatures $T_D$ and $T_S$, nor said TMFs, in order to limit the size of the storage means.

10 Claims, 3 Drawing Sheets

OPTRONIC INFRARED SYSTEM WITH PREDICTIVE MAINTENANCE IN TERMS OF THE NUMBER OF CYCLES BEFORE BREAKDOWN

CROSS-REFERENCE TO RELATED APPLICATIONS

This application is a National Stage of International patent application PCT/EP2009/054370, filed on Apr. 14, 2009, which claims priority to foreign French patent application No. FR 08 02336, filed on Apr. 25, 2008, the disclosures of which are incorporated by reference in their entirety.

FIELD OF THE INVENTION

The field of the invention is that of optronics systems such as thermal cameras, equipped with cooled infrared (IR) detectors, also designated detector coolers.

BACKGROUND

FIG. 1 shows a conventional detector cooler design comprising:
- an IR detector 1 placed in a vacuum chamber (cryostat 2) which maintains the temperature of this chamber at an operating temperature of the detector, or approximately −200° C.,
- a cooling machine 3 which uses, for example, helium and supplies the cryostat 2 with the refrigeration needed to bring its temperature (usually lower its temperature) from an ambient temperature to the operating temperature. The time needed to reach the operating temperature is designated "refrigerating time" (TMF). The overall performance is measured over a meaningful temperature range: from −173° C. to −190° C. The TMF to change from −173° C. to −190° C. is typically a few tens of seconds,
- a device 4 for servocontrolling this cooling machine according to the temperature Td of the detector supplied by a sensor 8.

The detector coolers that are used at present are fragile, heterogeneous in that no two identical detector coolers behave in the same way, and costly. The actual maintenance is limited to confirming the breakdown when it occurs, that is to say, by detecting a departure from the refrigerating time specification. The breakdown leads to unavailabilities and dissatisfaction among the users. Furthermore, the maintenance costs are high.

Consequently, there is currently a need for a system that makes it possible to overcome the abovementioned drawbacks without in any way increasing its bulk.

SUMMARY OF THE INVENTION

The underlying principle of the invention consists in anticipating malfunctions, that is to say, performing predictive maintenance in order to limit the breakdowns. This predictive maintenance is based on monitoring the state of health of the cooler-detector. More specifically, it is performed on the basis of the measurement of the drift in the refrigerating time. In practice, this drift in the TMF may betray:
- a helium leak from the cooling machine,
- pollution of the helium,
- a degradation of the cryostat vacuum, resulting in wear of the cooling machine in the form of:
- degradation of the mechanical elements of the cooling machine,
- degradation of the thermal insulation,
- variation of the optronics system's internal temperature when starting refrigeration,
- variation of the initial temperature of the detector when starting refrigeration.

The refrigerating time increases when the cooling machine wears out. Each time the cooling machine is started up, this TMF is measured. The invention is based on a statistical processing of these data. This makes it possible to predict the potential of the machine, that is to say the number of startups before the TMF exceeds a threshold value representative of an imminent breakdown, and thus control the operational availability of the detector cooler.

One of the drawbacks in this statistical processing lies in the storage of the data, because the optronics systems have little memory available for maintenance. The algorithm does away with the storage problems by saving aggregated data but not the temperature measurements or the TMFs. The algorithm enables each detector cooler to construct, on its own, its own behavior model. The system is "self-adaptive".

More specifically, the subject of the invention is an optronics system equipped:
a. with a detector cooler which comprises:
  i. a cooling machine,
  ii. a cryostat,
  iii. an IR detector placed in the cryostat,
  iv. a sensor for measuring the temperature $T_D$ of the detector,
b. with a processing card which includes means for servocontrolling the cooling machine according to the temperature $T_D$.

It is mainly characterized in that the system comprises a sensor for sensing the system's internal temperature $T_S$, and in that the processing card comprises means for calculating:
- the refrigerating time based on the temperatures $T_D$ and $T_S$, on each "on-off" cycle of the detector cooler,
- the trend of the drift in the refrigerating time TMF, as a function of the number of "on-off" cycles of the detector cooler,
- a number of "on-off" cycles of the detector cooler before breakdown as a function of said trend of the drift in the TMF, and means for storing data used in said calculations and in that these data are aggregated data and not the measurements of temperatures $T_D$ and $T_S$, nor said TMFs, in order to limit the size of the storage means.

This solution therefore makes it possible, with a minimum of memory space, to determine the remaining potential of the detector cooler. The result of this is notably a saving in the memory space needed for the other applications of the optronics system, better control of the detector cooler by the user, enhanced operational performance, an increase in autonomy by a reduction in the energy consumed by the detector cooler.

This then gives the opportunity to:
- trigger a preventive maintenance operation because the faults detected are reversible,
- give the user the choice to start out with a detector cooler that is in good condition rather than with excessively shortened potential.

It advantageously comprises a predictive maintenance indicator linked to the calculation means.

The breakdown is typically represented by a predetermined maximum TMF.

According to one feature of the invention, the calculation is carried out based on a TMF sum, an aggregated number of refrigerations, and an aggregate of the product of the number of the cycle concerned by the corresponding TMF.

Preferably, the calculation is carried out for different classes of temperature $T_S$ of the system.

Advantageously, each temperature class is the subject of independent calculations.

The drift in the TMF is typically a linear function of the number of cycles.

This optronics system is, for example, a thermal camera.

BRIEF DESCRIPTION OF THE DRAWINGS

Other features and advantages of the invention will become apparent from reading the following detailed description, given as a nonlimiting example, and with reference to the appended drawings in which.

From one figure to another, the same elements are identified by the same references.

DETAILED DESCRIPTION

Figure 1:
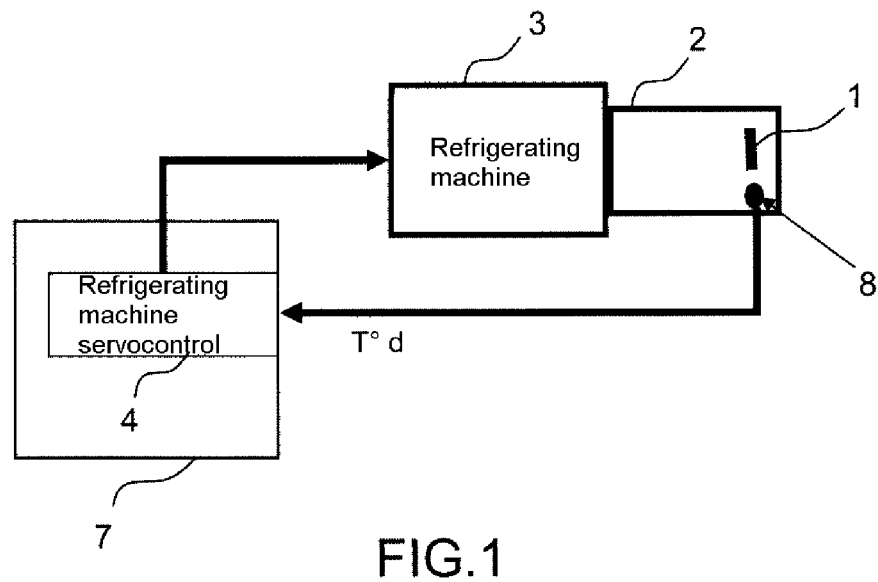
FIG. 1, already described, diagrammatically represents an optronics system according to the state of the art, FIG. 2 diagrammatically represents an optronics system according to the invention.
Figure 2:
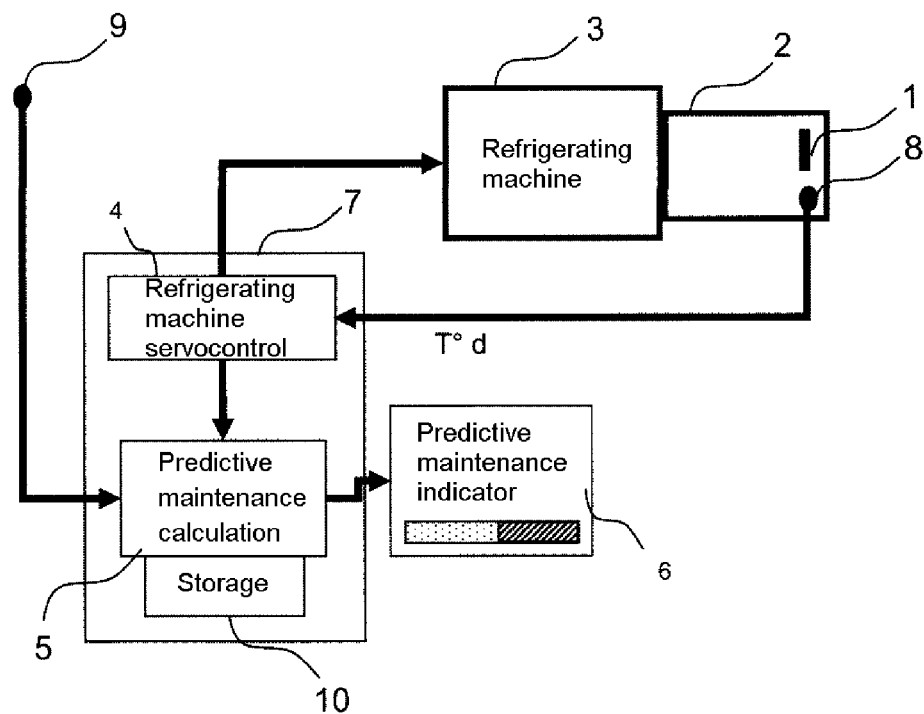

The system according to the invention represented in FIG. 2 comprises, in addition to the system of the state of the art, a sensor 9 for measuring the system's internal temperature Ts and calculation 5 and data storage 10 means, as well as a predictive maintenance indicator 6.

The invention is based on a statistical processing of the TMFs calculated on each startup of the cooling machine 3. This makes it possible to predict the startup potential of the cooling machine before breakdown, and thus control the operational availability of the detector cooler.

The potential is expressed by the ratio of the current number of cycles (start-stop) to the estimated number of cycles before reaching an acceptable maximum TMF. This calculation is described in relation to the flow diagram of FIG. 3.

This calculation is based on the measurement of the temperature $T_D$ of the detector and of the optronics system's internal temperature $T_S$ (step A). These measurements are then validated (step B), that is to say, they are taken into account only subject to certain conditions. In practice, the following factors disturb the measurement of the TMF. It is therefore essential to overcome these disturbances.

a. A variation in the optronics system's internal temperature $T_s$ when starting refrigeration.

The calculation is carried out for different classes of temperature $T_D$ or $T_s$, for example in steps of 5° C. Each temperature class is the subject of an independent average calculation. It is therefore pointless to relate the measurements to a reference temperature. Furthermore, it is assumed that, for a given optronics system, the conditions of use are fairly reproducible and therefore centered on two or three temperature classes. The example described hereinbelow is based on classes of temperature $T_D$ of the detector.

b. A variation in the initial temperature of the detector when starting refrigeration.

If the refrigeration is done a little after a shutdown, the TMF may be very short (the cryostat remains cold for a few hours after stopping the cooling machine "MAF"). This TMF is then not representative because the MAF does not perform a complete refrigeration cycle. These cases are eliminated by comparison of the initial temperature $T_D$ with the system's internal temperature $T_s$. If $T_D$ deviates too far from $T_s$, the measurement is not taken into account.

Once the measurements have been validated, a calculation of the number of cycles before breakdown is carried out for each temperature class. Each temperature class is the subject of independent calculations. It is therefore pointless to relate the measurements to a reference temperature.

For each temperature class, the following data are used:

TMF_TOT which is the sum of all the TMFs in the temperature class concerned,

Nb-cycles which is the aggregated number of refrigerations in the temperature class concerned, (CycleNo.TMF)-TOT which is the aggregate of the product of the number of the cycle concerned by the corresponding TMF, in the temperature class concerned.

These data are aggregate data whose value evolves as a function of the current measurement. Each measurement of TMF, $T_D$ and $T_s$ is therefore not saved. This makes it possible to limit the memory space dedicated to this TMF trend prediction.

As will be seen below, these aggregate data are saved in a table of K columns, K being the number of different temperature classes, the lines of the table corresponding to these data. The number K is, for example, determined by the number of 5° C. blocks.

The average TMF, TMF_MOY, which is equal to TMF_TOT/Nb-cycles, is also calculated; this datum is not saved in the table.

Figure 3:
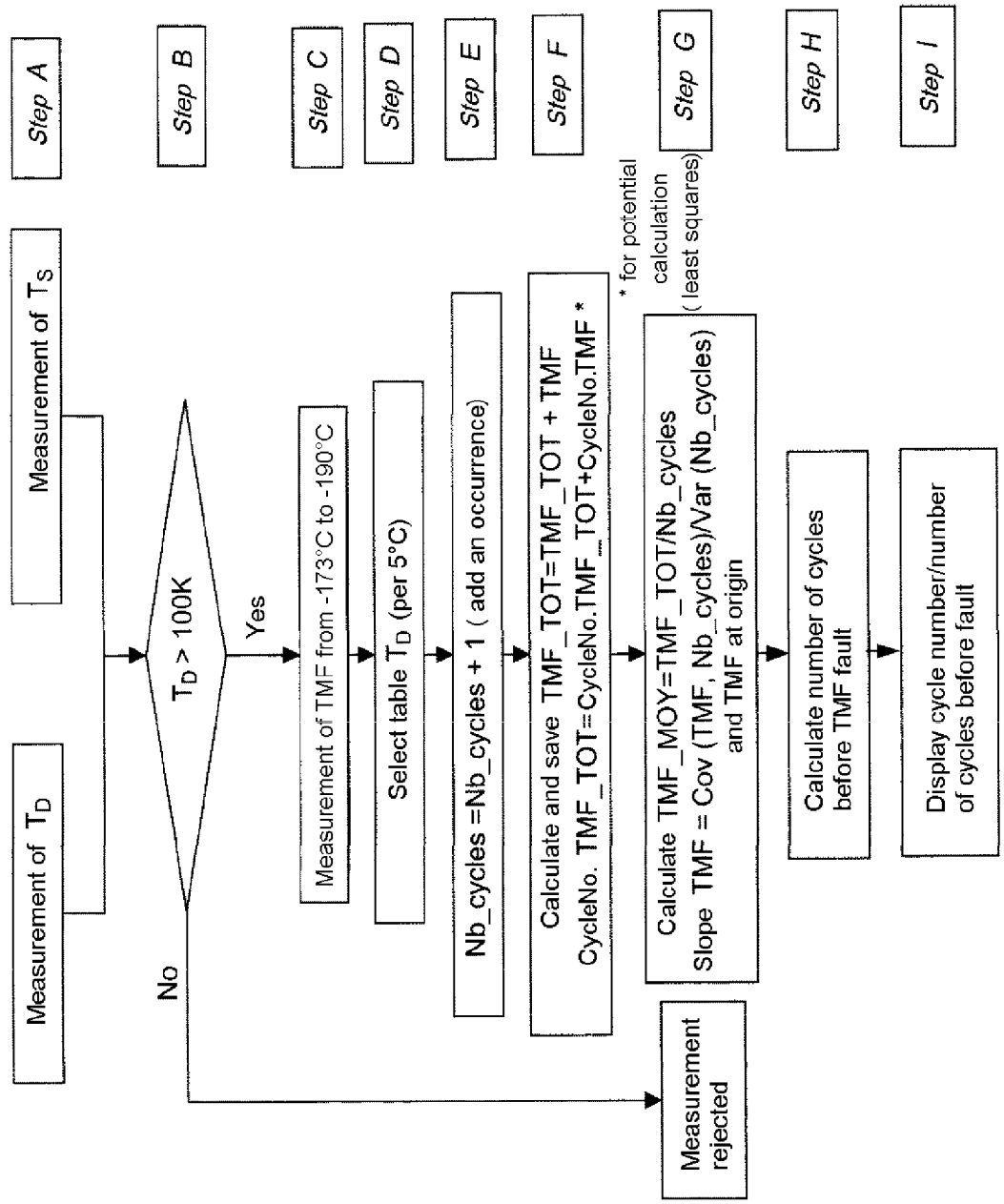
FIG. 3 is a flow diagram showing how the number of cycles before breakdown is calculated, FIG. 4 diagrammatically represents a curve of the temperature of the detector as a function of time.
Figure 4:
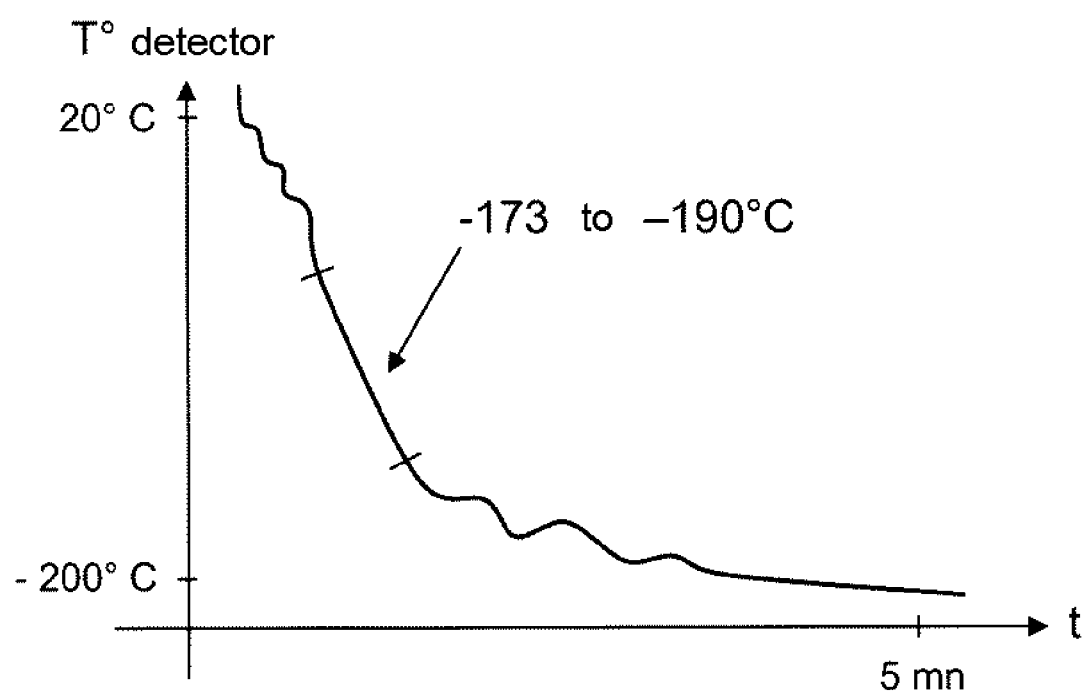

Reference should be made to the flow diagram of FIG. 3. The TMF is measured within a predefined temperature range (step C). This range is defined on the basis of the curve of the temperature of the detector $T_D$ as a function of time, diagrammatically represented in FIG. 4: this range corresponds to the quasi-linear portion of the curve typically lying between −173 and −190° C.

The column of the table in which the data is saved is selected according to the temperature $T_D$ of the detector (step D).

Various data are then calculated and saved in said column of the table in order for the trend of the refrigerating time to be calculated: Nb-cycles (step E), TMF_TOT, (CycleNo·TMF)_TOT (steps F and G). This trend is modeled by $$TMF = a \cdot CycleNo. + b$$

The slope "a" is estimated by the least squares method but without all the data being stored.

$$a = Covariance(TMF, Nb\_cycles)/Variance(Nb\_cycles) \quad (step\ G)$$

with:

$$Variance(Nb\_cycles) = [Sum(Cycle\_No.^2)/Nb\text{-}cycles] - Expectation(Nb\_cycles)^2$$

$$Variance(Nb\_cycles) = [Sum(1^2+2^2+3^2+4^2\ldots)/Nb\_cycles] - [Sum(1+2+3+4+\ldots)/Nb\_cycles]^2$$

The arithmetical series make it possible to generalize the expression $$Variance(Nb\_cycles) = [Nb\_cycles \cdot (Nb\_cycles+1) \cdot (2 \cdot Nb\_cycles+1)/6/Nb\_cycles] - [Nb\_cycles \cdot (1+Nb\_cycles)/2/Nb\_cycles]^2$$

$$Variance(Nb\_cycles) = [(Nb\_cycles+1) \cdot (2 \cdot Nb\_cycles+1)/6] - [(1+Nb\_cycles)/2]^2$$

$$Covariance(TMF, Nb\_cycles) = Expectation(TMF \cdot Cycle\_No.) - TMF\_moy \cdot Nb\_cycles\_moy$$

With
Expectation(TMF·CycleNo.)=(CycleNo·TMF)_TOT/Nb_cycles
TMF_moy is calculated on each cycle,
Nb_cycles_moy=(1+Nb_cycles)/2

Covariance (TMF, $Nb$_cycles)=[(CycleNo·TMF)_TOT/$Nb$_cycles]−[TMF_moy·(1+$Nb$_cycles)/2]

The value of the slope "a" of the TMF and the TMF at the origin of the straight line "b" are then updated on each new cycle (step G).

The extrapolation of the straight line to the limit TMF that is acceptable in light of the specification is then determined. The potential is expressed by the ratio of the current number of cycles to the estimated number of cycles before the acceptable max TMF is reached (step H), and displayed on a user interface (step I). This user interface 6 may be an audible and/or visual interface.

This method does away with the disparity problems associated with production. Each optronics system has an analysis specific to it. There is no generic model. As and when TMF measurements are made, the optronics system "constructs" its TMF trend model.

This solution therefore makes it possible, with a minimum of memory space, to determine the remaining potential of the detector cooler. The result of this is notably:
  a saving in the memory space (the memory space needed is 2 KB) which is thus available for other applications of the optronics system,
  better control of the detector cooler by the user,
  enhanced operational performance,
  an increase in autonomy through a reduction in the energy consumed by the detector cooler.

The invention claimed is:

1. A maintenance method for an optronics system equipped:
  with a detector-cooler which comprises:
  a cooling machine,
  a cryostat,
  an IR detector placed in the cryostat,
  a first sensor for measuring the temperature $T_D$ of the IR detector,
    with a processing card which includes means for servocontrolling the cooling machine according to the temperature $T_D$,
    comprising a number "nb-cycles" of refrigerating cycles of the cooling machine designated "on-off" cycles with, for each cycle, the following steps:
      calculation of the system's internal temperature $T_S$ by means of a second sensor measuring the system's internal temperature $T_S$,
      and calculation by the processing card of the refrigerating time TMF based on the temperatures $T_D$ and $T_S$,
      and, on completion of these "nb-cycles" "on-off" cycles, a step for calculation by the processing card:
        of the trend of the drift in the refrigerating time TMF, as a function of "nb-cycles",
        of a number of "on-off" cycles before breakdown, as a function of said trend of the drift in the TMF relative to a predetermined maximum TMF representative of a breakdown.

2. The maintenance method as claimed in claim 1, wherein on each "on-off" cycle of the detector-cooler, it includes a step for calculating the product of the TMF by the cycle number, and, on completion of the "nb-cycles" cycles, a step for storing the following aggregated data:
  "nb-cycles",
  the sum of the TMFs over the number "nb-cycles" of cycles concerned,
  the sum of the products of the TMF by the cycle number.

3. The maintenance method as claimed in claim 1, wherein the steps are reiterated for different classes of temperature $T_D$ of the detector or $T_S$ of the system.

4. The maintenance method as claimed in claim 3, wherein each temperature class is the subject of independent calculations.

5. The maintenance method as claimed in claim 1, wherein the drift in the TMF is a linear function of "nb-cycles".

6. A thermal camera equipped:
  with a detector-cooler which comprises:
  a cooling machine (3),
  a cryostat (2),
  an IR detector (1) placed in the cryostat,
  a first sensor (8) for measuring the temperature $T_D$ of the IR detector,
    with a second sensor (9) for measuring the camera's internal temperature $T_S$,
    with a processing card (7) which includes means (4) for servocontrolling the cooling machine according to the temperature $T_D$ and means for implementing the maintenance method for said camera as claimed in claim 1.

7. The thermal camera of claim 1, wherein on each "on-off" cycle of the detector-cooler, it includes a step for calculating the product of the TMF by the cycle number, and, on completion of the "nb-cycles" cycles, a step for storing the following aggregated data:
  "nb-cycles",
  the sum of the TMFs over the number "nb-cycles" of cycles concerned,
  the sum of the products of the TMF by the cycle number.

8. The thermal camera of claim 1, wherein the steps are reiterated for different classes of temperature $T_D$ of the detector or $T_S$ of the system.

9. The thermal camera of claim 8, wherein each temperature class is the subject of independent calculations.

10. The thermal camera of claim 1, wherein the drift in the TMF is a linear function of "nb-cycles".

* * * * *